US012785246B2

(12) United States Patent
Taguchi et al.

(10) Patent No.: US 12,785,246 B2
(45) Date of Patent: Nov. 3, 2026

(54) ANTENNA DEVICE

(71) Applicants: Makoto Taguchi, Katagami (JP); Daiki Momma, Katagami (JP); Ryutaro Miura, Katagami (JP); Hisashi Takizawa, Katagami (JP); Kazunari Saito, Katagami (JP); Yoshifumi Kishiue, Katagami (JP); Shinobu Wakahara, Toyota (JP); Takashi Saitoh, Miyoshi (JP)

(72) Inventors: Makoto Taguchi, Katagami (JP); Daiki Momma, Katagami (JP); Ryutaro Miura, Katagami (JP); Hisashi Takizawa, Katagami (JP); Kazunari Saito, Katagami (JP); Yoshifumi Kishiue, Katagami (JP); Shinobu Wakahara, Toyota (JP); Takashi Saitoh, Miyoshi (JP)

(73) Assignees: MITSUMI ELECTRIC CO., LTD., Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 479 days.

(21) Appl. No.: 18/308,715

(22) Filed: Apr. 28, 2023

(65) Prior Publication Data

US 2024/0014540 A1 Jan. 11, 2024

(30) Foreign Application Priority Data

Apr. 28, 2022 (JP) ................................ 2022-075331

(51) Int. Cl.

*H01Q 1/32* (2006.01)
*H01Q 1/22* (2006.01)
(Continued)

(52) U.S. Cl.

CPC ................ *H01Q 1/22* (2013.01); *H01Q 1/42* (2013.01); *H01Q 1/48* (2013.01)

(58) Field of Classification Search

CPC .. H01Q 1/22; H01Q 1/42; H01Q 9/42; H01Q 1/12; H01Q 1/20; H01Q 1/48; H01Q 9/0421; H05K 5/0217

See application file for complete search history.

(56) References Cited

U.S. PATENT DOCUMENTS

| | | | | |
|---|---|---|---|---|
| 7,353,003 B2 * | 4/2008 | Boman | H04M 1/0262 455/90.3 |
| 11,366,431 B2 * | 6/2022 | Erentok | G06F 1/169 |

(Continued)

FOREIGN PATENT DOCUMENTS

| | | | | |
|---|---|---|---|---|
| EP | 2950389 B1 * | 7/2021 | H01Q 1/48 |
| JP | 07-029920 U | 6/1995 | |
| WO | WO-2021150247 A1 * | 7/2021 | G06F 1/1613 |

*Primary Examiner* — Dimary S Lopez Cruz
*Assistant Examiner* — Marin Stoytchev Stoytchev
(74) *Attorney, Agent, or Firm* — Shih IP Law Group, PLLC.

(57) ABSTRACT

An antenna device including: an antenna element; an enclosure having a wall body on which the antenna element is placed in a state of being joined to an inner surface of the wall body; and a printed substrate on which the antenna element is mounted with a leg portion of the antenna element connected to one surface of the printed substrate, which is stored inside the enclosure. Holding pieces to sandwich the antenna element between the wall body of the enclosure and the holding pieces are formed at a predetermined interval on the inner surface of the wall body of the enclosure. Respective sizes of and intervals between the holding pieces are set such that a difference between a deflection amount of the wall body and a deflection amount of the antenna element when the enclosure vibrates is less than or equal to a predetermined value.

4 Claims, 6 Drawing Sheets

(51) Int. Cl.

| | |
|---|---|
| ***H01Q 1/42*** | (2006.01) |
| ***H01Q 1/48*** | (2006.01) |
| ***H01Q 9/42*** | (2006.01) |

(56) References Cited

U.S. PATENT DOCUMENTS

2014/0321046 A1* 10/2014 Sinha ........................ G06F 1/20
361/679.33
2022/0012957 A1* 1/2022 Rodriguez ............ G07C 5/085

* cited by examiner

ANTENNA DEVICE

REFERENCE TO RELATED APPLICATIONS

This application is based upon and claims the benefit of priority from the prior Japanese Patent Application No. 2022-075331, filed on Apr. 28, 2022, the entire contents of which are incorporated herein by reference.

TECHNICAL FIELD

The present invention relates to an antenna device including antenna elements mounted on a printed substrate, and relates to a technology effective for application to an antenna device to be mounted on a vehicle, for example.

DESCRIPTION OF RELATED ART

It is requested that an antenna device to be mounted on a vehicle to transmit/receive radio communication signals in a predetermined frequency band should be compact, and thus, a device with an antenna element (antenna element) mounted on a printed substrate or ground plane on which electronic components such as an amplifier and a filter are mounted has been put into practical use. On the other hand, the trend toward hybrid and electric vehicles in the field of motor vehicles has recently increased vehicles with quiet engine sound. Therefore, it is urgently needed to take measures against abnormal noise generated from a product in order to maintain a comfortable in-vehicle space.

In conventional on-board antenna devices, an antenna element is fixed to a case mainly by a method using a fixing component such as a double-sided tape or screw clamp. On the other hand, methods without using a fixing component include methods such as bonding with an adhesive agent and heat sealing. In either method, an antenna element is fixed to a case with the above-described technique upon taking measures for reducing noise, such as sticking a noise reducing tape to the antenna element, from the perspectives of an influence of contraction/expansion caused by a surrounding temperature environment, accuracy of components, deflection of components caused by vibrations, and the like.

The fixing method with an adhesive agent or by heat sealing requires a curing time and a cooling time to be ensured after work, which increases the time required for completing a product. Further, the case of an adhesive agent raises a problem of degradation of an adhesive force due to environmental changes, and the fixing method utilizing heat, such as heat sealing, should not be used for a case made of a thermosetting resin, which raises a problem of fewer material options.

On the other hand, as a measure against abnormal noise generated by components hitting each other due to deflection of the components caused by vibrations, a measure such as changing the material to a highly stiff material for increasing stiffness of the components themselves or making the components thicker is taken in some cases. Such a case, however, raises problems of increase in component cost and increase in product weight.

Japanese Utility Model Laid-Open No. H7-29920 describes a device for avoiding reduction in viscosity force due to aging changes in the method for fixing an antenna element with a double-sided tape. The device of Japanese Utility Model Laid-Open No. H7-29920 is configured such that four supports (supporting pieces) to be in contact with side surfaces of an antenna element having a rectangular shape are provided on a power feeding substrate to fix and support the antenna element from the outside by an elastomeric force. Although this device restrains lateral vibrations of the antenna element, it is difficult to restrain vertical vibrations merely with the four supports, and abnormal noise generated by the antenna element hitting the power feeding substrate is not sufficiently prevented.

SUMMARY OF THE INVENTION

The present invention has been made in view of the above-described problems, and an objective thereof is to provide an antenna device that reduces abnormal noise generated by antenna elements hitting a case (an enclosure) while avoiding increase in the time required for completing a product, cost increase, and weight increase.

Another objective of the present invention is to provide an antenna device that increases options for a case material.

To achieve the above-described objective, according to an aspect of the present invention, there is provided an antenna device including:

an antenna element which is one or two or more antenna elements;

an enclosure having a wall body on which the antenna element is placed in a state in which the antenna element is joined to an inner surface of the wall body; and a printed substrate on which the antenna element is mounted with a leg portion of the antenna element connected to one surface of the printed substrate, the printed substrate being stored inside the enclosure, wherein a plurality of holding pieces to sandwich the antenna element between the wall body of the enclosure and the holding pieces are formed at a predetermined interval on the inner surface of the wall body of the enclosure, and wherein respective sizes of and intervals between the plurality of holding pieces are set such that a difference between a deflection amount of the wall body and a deflection amount of the antenna element when the enclosure vibrates is less than or equal to a predetermined value (e.g., 0.01 mm).

According to the aspect of the present invention, even if the antenna elements and the wall body of the enclosure (case) have a gap generated therebetween and hit each other, abnormal noise is not generated, or if generated, is reduced to an extent which is very small and inaudible.

The antenna elements are sandwiched between the holding pieces and the wall body so as to be fixed to the case, the holding pieces being integrally provided on the wall body of the enclosure (case). This configuration eliminates the need to use a fixing component. This brings advantages of avoiding cost increase and weight increase, and shortening the time required for completing the product because neither an adhesive agent nor heat sealing is used. A further advantage is that options for the case material are increased because heat sealing is not used.

The aspect of the present invention reduces abnormal noise generated by the antenna elements hitting the case while avoiding increase in the time required for completing the product, cost increase, and weight increase. In addition, there is an effect of increasing options for the case material.

BRIEF DESCRIPTION OF DRAWINGS

The accompanying drawings are not intended as a definition of the limits of the invention but illustrate embodiments of the invention, and together with the general description given above and the detailed description of the embodiments given below, serve to explain the principles of the invention, wherein.

DETAILED DESCRIPTION

Hereinafter, a suitable embodiment of the present invention will be described with reference to the drawings.

Figure 1A:
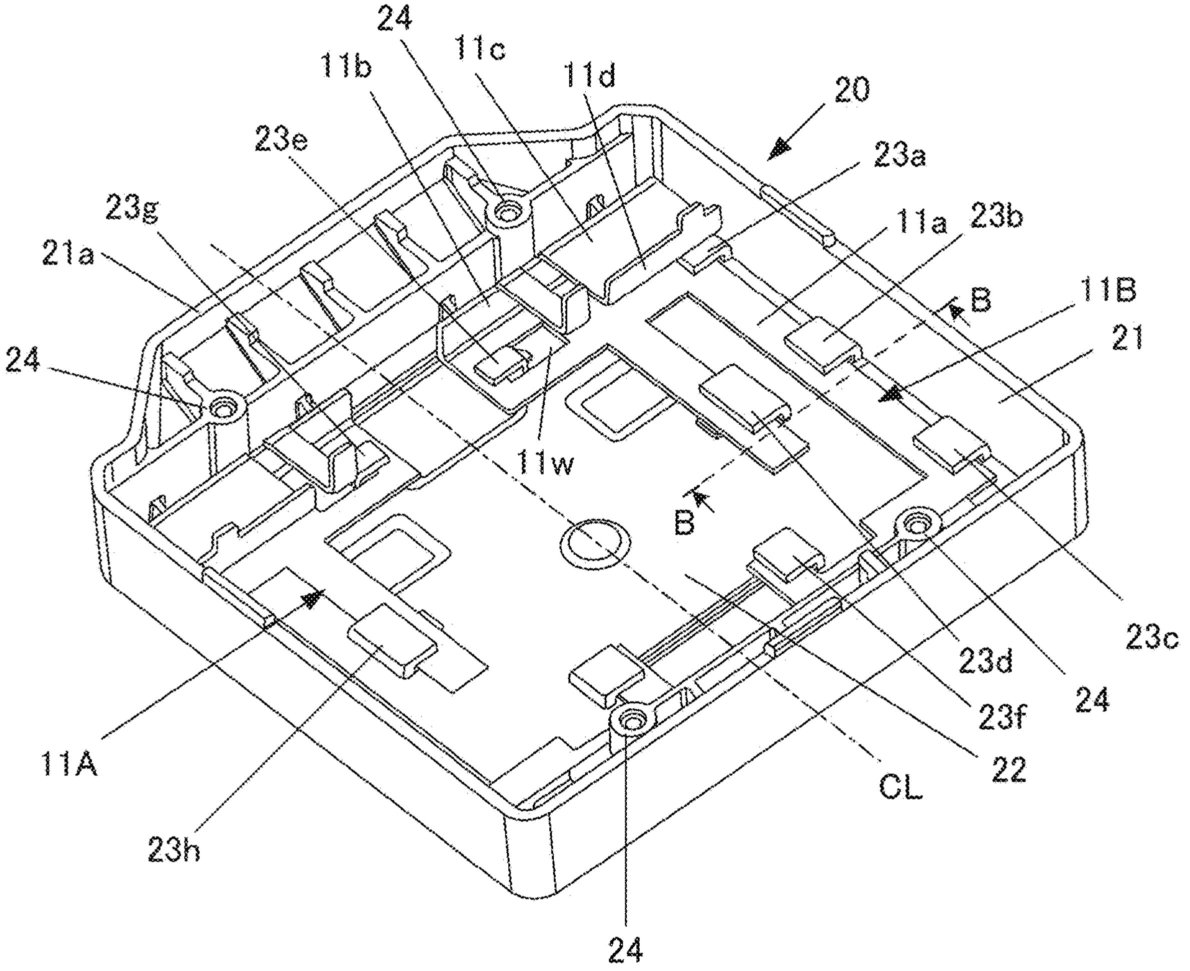
FIG. 1A is a perspective view showing an essential portion (a case with antenna elements placed therein) of an embodiment of an antenna device to which the present invention has been applied.

FIG. 1A shows a perspective view of an essential portion of an embodiment of an antenna device according to the present invention. In the following description, a left upper side of the antenna device shown in FIG. 1A will be referred to as a front end side, and a right lower side will be referred to as a rear end side.

Figure 1B:
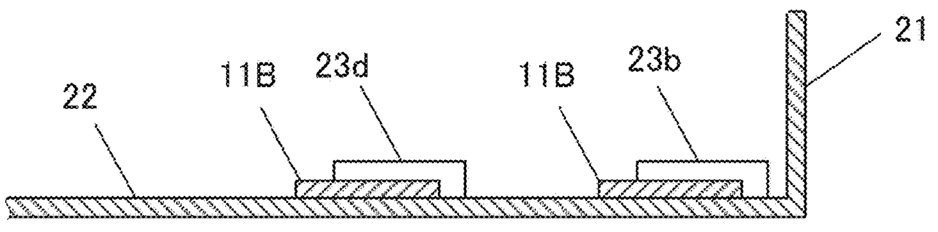
FIG. 1B is a cross-sectional view showing a cross-sectional structure along the line B-B in FIG. 1A.

The antenna device of the present embodiment is composed of a case (an enclosure) with a surface opened, a circuit substrate on which a pair of antenna elements are mounted and which is stored in the above-described case, and a plate-shaped bracket joined to the opening side of the above-described case to close the opening. Among them, an inner configuration of a case 20 is shown in FIG. 1A as a perspective view. A cross-sectional structure along the line B-B in FIG. 1A is shown in FIG. 1B.

As shown in FIG. 1A, the case 20 has a frame body 21 that forms a recess having a rectangular shape and a wall body 22 formed integrally with the frame body 21 and covering one of openings, and is made of a synthetic resin. A bulging portion 21*a* is formed on one of side surfaces of the frame body 21 in correspondence to a connector which will be described later.

On an inner surface of the above-described wall body 22, a plurality of holding pieces 23 constituting fixing means having a snap fit structure for fixing a pair of antenna elements 11A and 11B made of a conductive metal plate to the inside of the case are formed.

Although not particularly limited, in the antenna device of the present embodiment, the two antenna elements 11A and 11B are formed to have a symmetrical shape and receive signals (radio waves) in an identical frequency band. Each of the antenna elements 11A and 11B is formed of a plate-like member and composed of a horizontal portion 11*a* parallel to a circuit substrate which will be described later, a perpendicular portion 11*b* bent upward from one of sides of the horizontal portion 11*a*, a bent portion 11*c* bent rearward from the perpendicular portion 11*b* by 90 degrees, and a leg portion 11*d* bent upward from the bent portion 11*c*, with the horizontal portion 11*a* attached in a state in contact with the inner surface of the above-described wall body 22 at a predetermined interval.

A plurality of (e.g., six) holding pieces 23*a* to 23*f* for fixing the antenna element 11B to the inner surface of the wall body 22 have a cross-sectional shape including a horizontal portion and a leg portion so as to have a predetermined interval from the inner surface of the wall body 22 and form gaps in which the antenna element 11B is to be inserted as shown in FIG. 1B. The holding pieces 23*a* to 9 23*f* are all formed to be oriented in an identical direction (diagonally downward to the left in the drawing) as shown in FIG. 1A. Holding pieces 23*g*, 23*h* . . . for fixing the antenna element 11A to the inner surface of the wall body 22 are also provided in the same shape and by the same number (six) as the holding pieces 23*a* to 23*f*, and are formed at line symmetric positions with respect to the above-described holding pieces 23*a* to 23*f* with the interposition of the center line CL of the case 20 to be oriented in the opposite direction (diagonally upward to the right).

Since the holding pieces 23*a* to 23*f* are formed to be oriented in the identical direction as described above, the antenna element 11B is first joined to the inner surface of the wall body 22 at the time of assembly, then slid along the surface, and press-fitted into the gaps between the holding pieces 23*a* to 23*f* and the inner surface of the wall body 22 to be placed at a predetermined position on the inner surface of the case 20. The original gaps between the holding pieces 23*a* to 23*f* and the inner surface of the wall body 22 are set to be slightly narrower than the thickness of the antenna element 11B, and configured such that in a state where the antenna element 11B is inserted, the holding pieces 23*a* to 23*f* press and fix the antenna element 11B by elastomeric resilience.

The antenna device of the present embodiment is configured such that an opening 11*w* is formed on a base portion side of the horizontal portion 11*a* of the antenna element 11B in correspondence to one (23*d*) of the holding pieces 23*a* to 23*f*, and the holding piece 23*e* is inserted through the opening 11*w* to press and fix an edge of the opening 11*w*. By providing the opening 11*w* and the holding piece 23*e* in this manner, the base portion of the antenna element 11B is prevented from locally rising from the inner surface of the wall body 22 of the case 20 to generate a gap.

Further, in the antenna device of the present embodiment, the thickness, width, and length of the holding pieces 23*a* to 23*f* as well as intervals therebetween are set considering an elastic coefficient of the material of the case 20 such that a difference between a deflection amount of the wall body 22 of the case 20 and a deflection amount of each of the antenna elements 11A and 11B when the case vibrates is less than or equal to 0.01 mm in order to reduce abnormal noise generated by the antenna elements and the case making contact with each other due to deflection of the antenna elements 11A and 11B fixed to the case 20.

Herein, the reason for setting the difference between the deflection amount of the wall body 22 of the case 20 and the deflection amount of each of the antenna elements 11A and 11B when the case vibrates at less than or equal to 0.01 mm will be described.

In an antenna device having a configuration as shown in FIG. 1A, the case and the antenna elements will undergo deflection when the case vibrates. The difference between the respective deflection amounts brings the case and the antenna elements into contact with each other, resulting in generation of abnormal noise. In order to prevent generation of abnormal noise, the case and the antenna elements should satisfy either A. of being always kept away from each other even when an acceleration is applied or B. of being always in contact with each other with the deflection amounts continuously following them even when an acceleration is applied.

Under the condition A, however, it is difficult to create the situation in which the case and the antenna elements are always kept from coming into contact with each other from the perspective of antenna performance. Prior consideration made by the inventors of the present invention has revealed that under the condition B, differences in material and thickness between the case and the antenna elements result in different deflection amounts, but if the difference between the respective deflection amounts is less than or equal to a certain threshold value, abnormal noise is not generated, or if generated, is very small and inaudible even if a gap is generated and the case and the antenna elements hit each other.

The gap amount (threshold value) when it was determined in the prior consideration that abnormal noise would not be generated was 0.01 mm, and the inventors of the present invention examined by simulation of a relationship between each interval between the holding pieces 23*a*, 23*b*, and 23*c* and the difference between the deflection amount of the case and the deflection amount of the antenna elements (the gap amount) in a case where the material of the case 20 was a polycarbonate/ABS resin and the holding pieces 23*a* to 23*c* had a thickness of 1 mm, a width of 6 mm, and a length of 5 mm with respect to the antenna elements having a thickness of 0.6 mm and a length of 49.4 mm.

Figure 2:
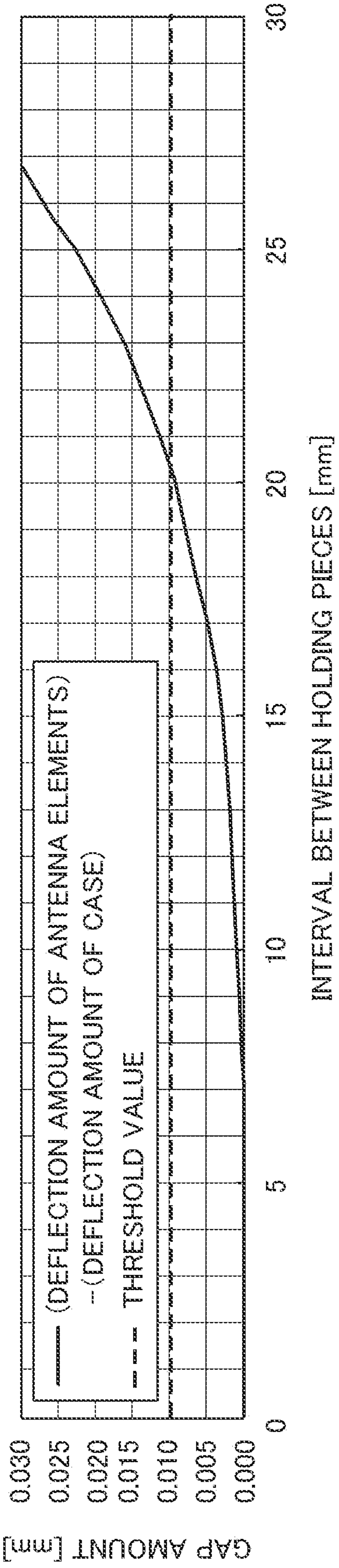
FIG. 2 is a graph showing a gap amount between the antenna element and a wall body of the case (a deflection amount of the antenna elements–a deflection amount of the wall body of the case) in a case where the interval between holding pieces is changed in the antenna device of the embodiment.

As a result, a result shown in FIG. 2 was obtained. It was confirmed from FIG. 2 that the gap amount was reduced to be less than or equal to 0.01 mm which was the above-described threshold value by setting each interval between the holding pieces 23*a*, 23*b*, and 23*c* at less than or equal to 20 mm. Consequently, the antenna device of the present embodiment described above enables abnormal noise generated by the antenna elements hitting the wall surface of the case to be reduced to an inaudible extent. The size of the holding pieces 23 in the embodiment is not limited to the above-described dimensions, and the size of and interval between the holding pieces 23 are set so as to reduce the gap amount between the antenna elements and the case to less than or equal to 0.01 mm. The material of the case 20 is not limited to a polycarbonate/ABS resin.

The configuration shown in FIG. 1A does not represent all the components of the antenna device. The antenna elements 11A and 11B in FIG. 1A are mounted on the circuit substrate and stored in the case 20, and the bracket is further coupled to cover the opening of the case 20 to obtain a finished product. Hereinafter, the configuration of the whole antenna device will be described using FIG. 3 and FIG. 4.

Figure 3:
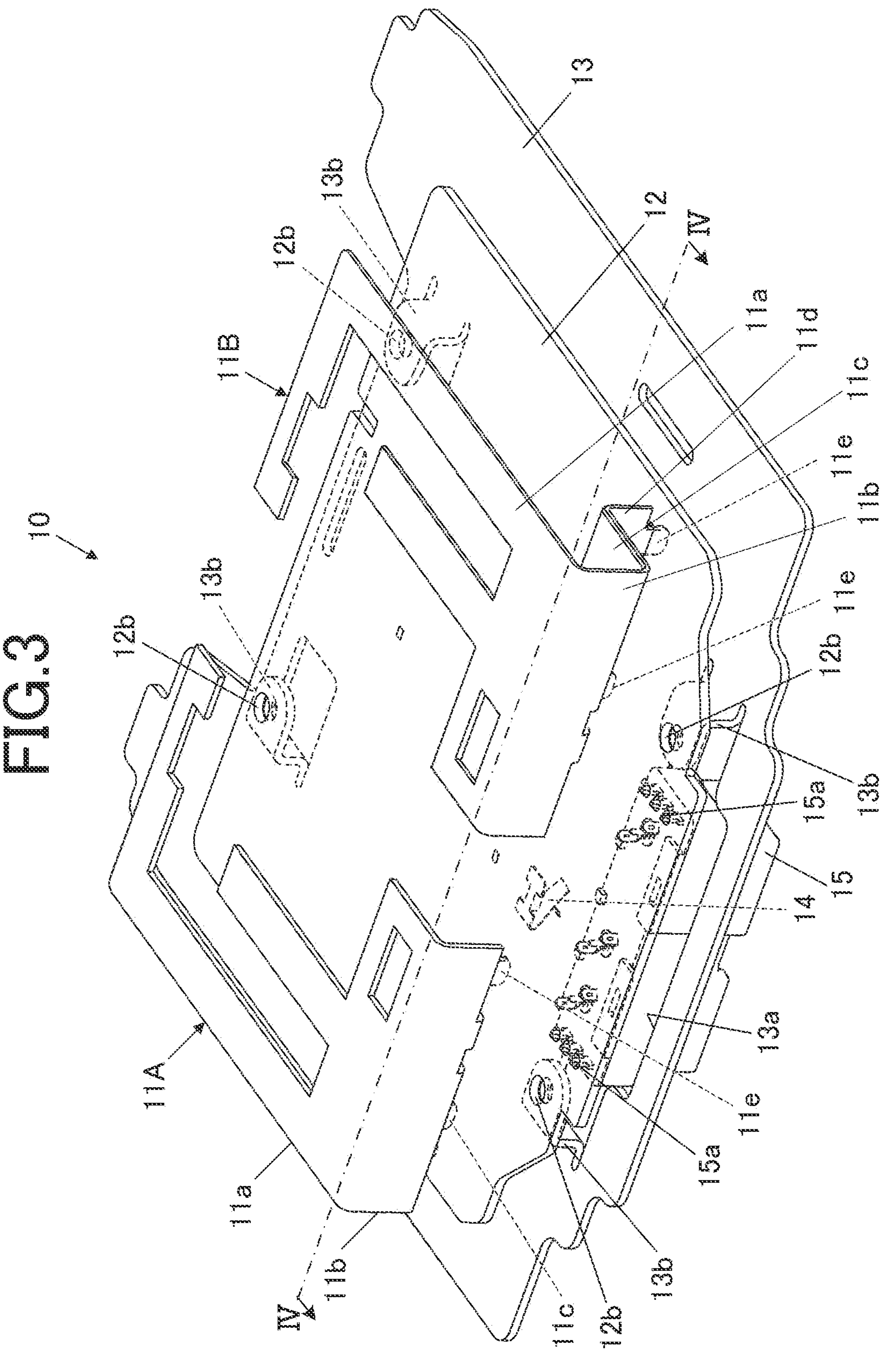
FIG. 3 is a perspective view showing a state with the case of the antenna device of the embodiment removed.

As shown in FIG. 3, the antenna device 10 of the present embodiment includes the two antenna elements 11A and 11B, a circuit substrate 12 on which these antenna elements 11A and 11B are mounted, and a plate-shaped bracket 13 made of a conductive metal and disposed under the circuit substrate 12 to be coupled to a lower surface side of the circuit substrate 12 with bolts. A ground potential is applied to the bracket 13, and the bracket 13 functions as a ground substrate. The bracket 13 has a rectangular shape slightly larger than the circuit substrate 12, and also has a function as an enclosure that protects the lower surface side of the circuit substrate 12.

Although not particularly limited, in the antenna device 10 of the present embodiment, the two antenna elements 11A and 11B are formed to have a symmetrical shape and receive signals (radio waves) in an identical frequency band. The respective antenna elements 11A and 11B are formed to have a hook shape with the horizontal portion 11*a* parallel to the circuit substrate 12, the perpendicular portion 11*b* extending downward from one of sides of the horizontal portion 11*a* toward the circuit substrate 12, the bent portion 11*c* bent rearward from the perpendicular portion 11*b* by 90 degrees, and the leg portion 11*d* bent downward from the bent portion 11*c*, and are disposed at a predetermined interval.

Further, a plurality of (e.g., two) engaging projections 11*e* are provided at lower ends of the leg portions 11*d* of the antenna elements 11A and 11B. When the engaging projections 11*e* are engaged with slit-like engaging holes formed in a predetermined portion of the circuit substrate 12, the antenna elements 11A and 11B are coupled to the circuit substrate 12. It is configured such that the above-described two engaging projections 11*e* are coupled to the circuit substrate 12 by soldering, and the engaging projection 11*e* of the two engaging projections 11*e* that is located on a lateral side of the substrate is caused to adhere to the circuit substrate 12 by soldering, is electrically connected to a power feeding strip line formed to electrically connect the site and a connector terminal, and serves as a power feeding point to the antenna elements 11A and 11B.

The above-described circuit substrate 12 is implemented by a printed substrate having a wiring pattern made of a conductive layer, and electronic components constituting a distributor, an amplifier, a filter, an attenuator, and the like are mounted although not shown. A spring contact 14 implemented by a plate spring of a conductive material forming a z-shape when seen from the rear side is fixed to the lower surface of the circuit substrate 12 at a position in the vicinity of a position between the perpendicular portions 11*b* of the antenna elements 11A and 11B in a manner protruding downward. Specifically, the spring contact 14 has an upper horizontal piece, an inclined piece protruding diagonally downward from an end of the upper horizontal piece, and a lower horizontal piece bent from the inclined piece in the horizontal direction. The upper horizontal piece is connected to the lower surface of the circuit substrate 12. The shape of the spring contact 14 is not limited to the Z-shape.

A connector 15 is provided on an edge of the lower surface of the circuit substrate 12 on the side where the antenna elements are coupled, and an end of a coaxial cable (hereinafter abbreviated to a cable) to connect to an instrument called a head unit having a tuner and the like is inserted in and connected to the connector 15 from below. The connector 15 has a plurality of engaging pieces 15*a* formed on both lateral sides on its upper surface, the engaging pieces 15*a* protruding upward and having claws at the leading ends. When these engaging pieces 15*a* are inserted in the engaging holes formed in a predetermined portion of the circuit substrate 12, the connector 15 is coupled to the circuit substrate 12. The circuit substrate 12 has formed thereon a linear wiring pattern (a strip line) that connects a terminal to which an inner-cable conductor of the connector 15 is connected and the power feeding point of the aforementioned antenna elements 11A and 11B.

Figure 4:
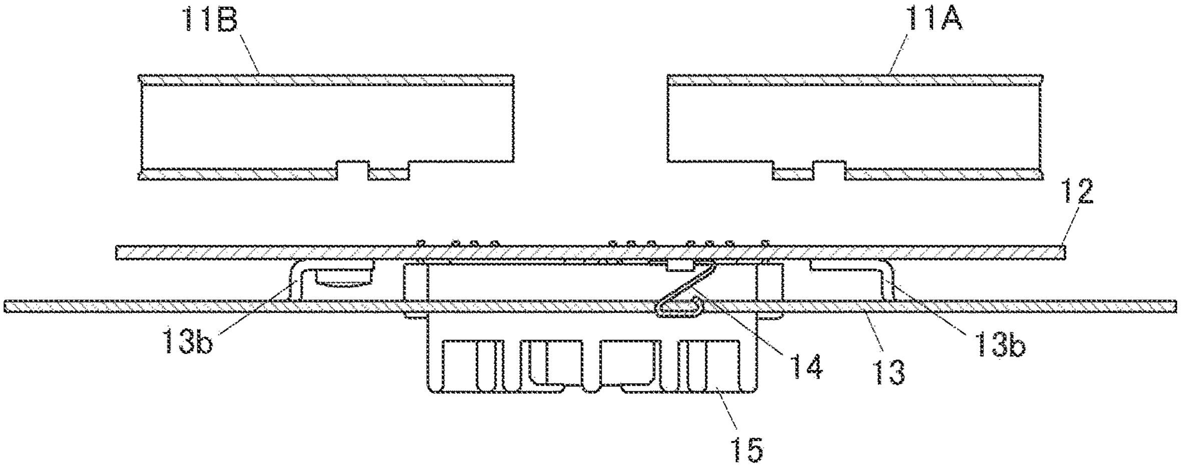
FIG. 4 is a cross-sectional view of the antenna device showing a cross-sectional structure along the line IV-IV in FIG. 3.

Further, the circuit substrate 12 has formed thereon a conductive layer over most of a region including the installation position of the spring contact 14 and excluding the wiring pattern (strip line) electrically connecting the above-described electronic components to each other and connecting the electronic components and the connector. The height is set such that the above-described spring contact 14 is connected to the circuit substrate 12 in a state being electrically connected to this conductive layer and the lower horizontal piece on the lower end of the inclined piece of the spring contact 14 is coupled to the aforementioned bracket 13 as shown in FIG. 4.

As described above, when the spring contact 14 is connected to the bracket 13 having the ground potential, a state in which the ground potential is applied to the above-described conductive layer of the circuit substrate 12 is brought about. In other words, the spring contact 14 serves as a ground point of the circuit substrate 12.

On the other hand, an opening 13*a* is formed in the bracket 13 at a site corresponding to the above-described connector 15, and the connector 15 is inserted through the opening 13*a*. Seats 13*b* formed by cutting out and raising part of the bracket 13 and bent into nearly U shapes in front view are formed at a plurality of places (four places in the drawing) of the bracket 13.

Figure 5A:
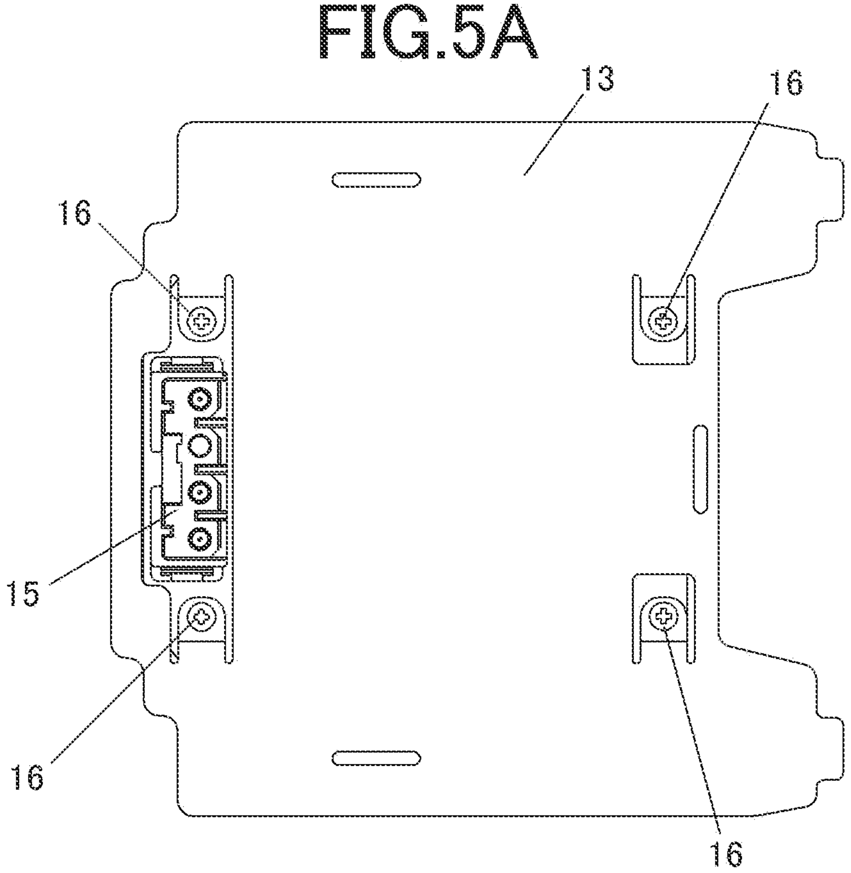
FIG. 5A is a bottom view showing a state in which the case and a ground substrate have been coupled.
Figure 5B:
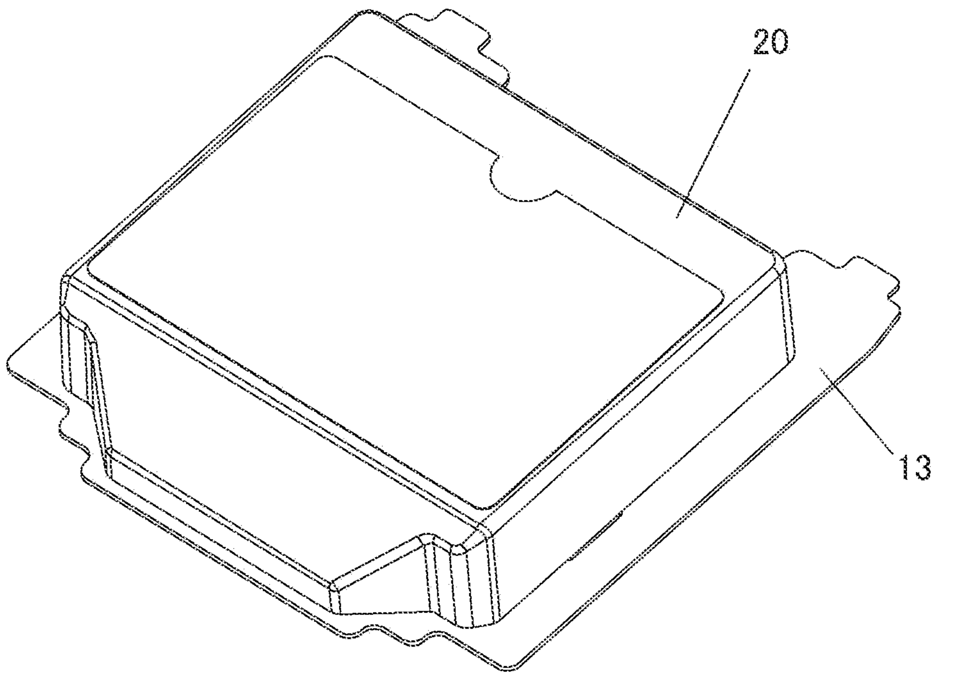
FIG. 5B is a perspective view showing the state in which the case and the ground substrate have been coupled.

It is configured such that the lower surface of the above-described circuit substrate 12 is joined to upper surfaces of the above-described four seats 13*b*, and screws 16 are inserted through the upper horizontal pieces of the seats 13*b* and screw insertion holes 12*b* formed at corresponding sites in the circuit substrate 12 as shown in FIG. 5A to be screwed with bosses 24 (see FIG. 1A) provided on the inner side of the case 20, thereby integrating the circuit substrate 12 and the bracket 13 with the case 20 to obtain a finished product. FIG. 5B shows the antenna device of FIG. 5A in a finished state.

In the antenna device having a configuration as shown in FIG. 3, the interval between the antenna elements 11A, 11B and the circuit substrate 12 affects receiving sensitivity of the antenna, and a larger interval is better. However, the interval between the circuit substrate 12 and the bracket 13 does not affect the receiving sensitivity of the antenna, and thus, it may also be configured such that the lower surface of the circuit substrate 12 and the upper surface of the bracket 13 are joined to each other with the seats 13*b* removed. The reason for providing the seats 13*b* for the bracket 13 as described above nonetheless is because it is difficult to sufficiently reduce the height of the connector 15 used, while a protruding amount of the connector 15 from the lower surface of the case that stores the whole antenna device shown in FIG. 1A is defined by user specifications. Consequently, the seats 13*b* may not be provided for the bracket 13 depending on conditions.

Further, the aforementioned conductive layer in the circuit substrate 12 is provided to extend around the screw insertion holes 12*b* in the circuit substrate 12 corresponding to two seats located on both sides of the connector 15 among the above-described seats 13*b* at the four places. Therefore, when screws having conductivity are inserted in the screw insertion holes 12*b* in the circuit substrate 12 corresponding to the screw insertion holes of the seats to couple the circuit substrate 12 and the bracket 13, the circuit substrate 12 and the bracket 13 are electrically connected via the screws.

On the other hand, the aforementioned conductive layer is not provided to extend around the screw insertion holes 12*b* in the circuit substrate 12 corresponding to two seats located on the farther side from the connector 15 among the seats 13*b* at the four places. In other words, application of the ground potential to the aforementioned conductive layer of the circuit substrate 12 is limited to the aforementioned spring contact 14 and the two seats 13*b* located on both the sides of the connector 15.

This is because in the antenna device of the present embodiment, the antenna elements 11A and 11B are partially present above the two seats located on the farther side from the connector 15, and if the aforementioned conductive layer of the circuit substrate 12 is provided to extend to these sites, the distance between the antenna elements 11A, 11B and the conductive layer decreases, resulting in degraded receiving sensitivity.

In contrast, the antenna elements 11A and 11B are absent above the two seats 13*b* located on both the sides of the connector 15, and thus, the receiving sensitivity will not be degraded even if the conductive layer of the circuit substrate 12 and the bracket 13 are connected. Therefore, the two seats located on both the sides of the connector 15 can also be connected to the ground potential. Because the connection here results in insufficient application of the ground potential, the spring contact 14 is separately provided in the present embodiment to avoid the situation in which application of the ground potential is insufficient.

Instead of the spring contact 14 which is elastically deformable, the aforementioned conductive layer of the circuit substrate 12 and the connector 15 may be connected with a member such as a screw which is not elastically deformable. The spring contact 14 and the screw are not limited to metal, and a material that is conductive, such as resin, may be used instead of metal. Although the antenna device 10 of the present embodiment is provided with the two antenna elements 11A and 11B that receive signals (radio waves) in an identical frequency band, it may also be configured such that the antenna elements 11A and 11B are changed in length to receive signals (radio waves) in different frequency bands.

Figure 6:
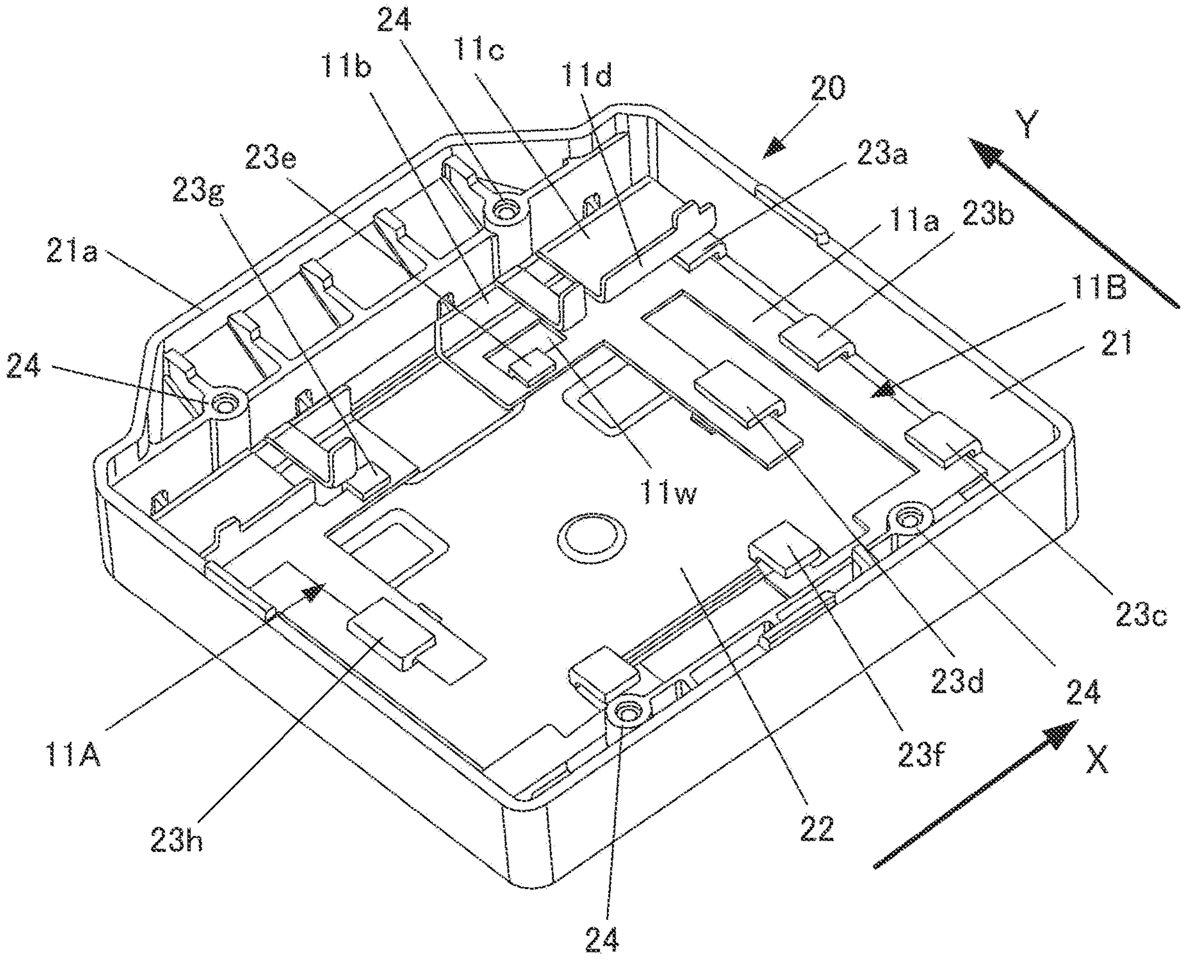
FIG. 6 is a perspective view showing a modification of the antenna device of the embodiment.

The antenna device of the embodiment shown in FIG. 1A has been described as having a configuration in which the antenna elements 11A and 11B are each slid sideways from the central side to be press-fitted in the gaps between the holding pieces 23*a* to 23*f* and the inner surface of the case 20, thereby placing the antenna elements 11A and 11B on the case 20, but is not limited thereto. As shown in FIG. 6, for example, it may also be configured such that the antenna element 11B is slid forward (in the X direction) after being slid sideways (in the Y direction) from the central side to be inserted and placed in the gaps between the holding pieces 23*a* to 23*f* and the inner surface of the case 20. In the case of such a configuration, both 23*e* and 23*f* among the holding pieces 23*a* to 23*f* may be changed in orientation from the other holding pieces by 90 degrees to be formed to face rearward. The same applies to the other antenna element 11A.

Although the invention made by the inventors of the present invention has been specifically described above based on the embodiment, the present invention is not limited to the aforementioned embodiment. For example, in the aforementioned embodiment, the ground point of the circuit substrate 12 and the bracket 13 are connected with physical contact means such as a spring contact. However, the ground point should only be connected by high frequency with a structure in which opposite electrodes or metal layers, for example, face each other and behave like a capacitor, and physical contact is not necessary.

Although the antenna device in which the two antenna elements 11A and 11B are mounted on the circuit substrate 12 has been shown in the aforementioned embodiment, the number of antenna elements is not limited to two, and may be one or may be three or more. The shapes of the antenna elements are not limited to those shown in FIG. 1A, and the present invention may be applied to an antenna device with antenna elements having other shapes mounted on a circuit substrate.

The invention claimed is:

1. An antenna device comprising:

at least one antenna element;

an enclosure having a wall body on which the at least one antenna element is placed in a state in which the at least one antenna element is joined to an inner surface of the wall body; and a printed substrate on which the at least one antenna element is mounted with a leg portion of the at least one antenna element connected to one surface of the printed substrate, the printed substrate being stored inside the enclosure, wherein a plurality of holding pieces to sandwich the at least one antenna element between a bottom wall of the enclosure and the holding pieces are formed at a predetermined interval on the inner surface of the bottom wall of the enclosure, wherein each of the plurality of holding pieces includes a leg portion erected on the bottom wall and a horizontal portion extending from the leg portion in a direction parallel to the bottom wall, the horizontal portion is in contact with a part of the at least one antenna element, the part being on an opposite side to the bottom wall, and a thickness, a width, and a length of each of the plurality of holding pieces and the predetermined interval between the plurality of holding pieces are set such that a difference between a deflection amount of the bottom wall and a deflection amount of the at least one antenna element when the enclosure vibrates is less than or equal to a predetermined value, the deflection amount of the bottom wall being an amount by which the bottom wall deflects, and the deflection amount of the at least one antenna element being an amount by which the at least one antenna element deflects, wherein all horizontal portions of the plurality of holding pieces provided in correspondence to one antenna element among the at least one antenna element are formed to be oriented in a same direction, wherein an opening through which a holding piece among the holding pieces is configured to be inserted is formed in the antenna element, and wherein at least one holding piece among the plurality of holding pieces sandwiches an edge of the opening between the bottom wall and the at least one holding piece, and a holding piece other than the at least one holding piece among the plurality of holding pieces sandwiches an outer edge of the antenna element between the bottom wall and the holding piece.

2. The antenna device according to claim 1, comprising a ground substrate which is provided to face a surface opposite to the one surface of the printed substrate, which is spaced away from the printed substrate at an interval, and to which a ground potential is applied, wherein the printed substrate is stored inside the enclosure with the ground substrate being coupled to an opening side of the enclosure with a plurality of screws.

3. The antenna device according to claim 2, wherein one end of a spring contact formed of a conductive plate spring is connected to a position to be a ground point on the surface of the printed substrate facing the ground substrate, and the other end of the spring contact is connected to a facing side of the ground substrate.

4. The antenna device according to claim 1, wherein the predetermined value is 0.01 mm.

* * * * *